ated Feb. 22, 1955

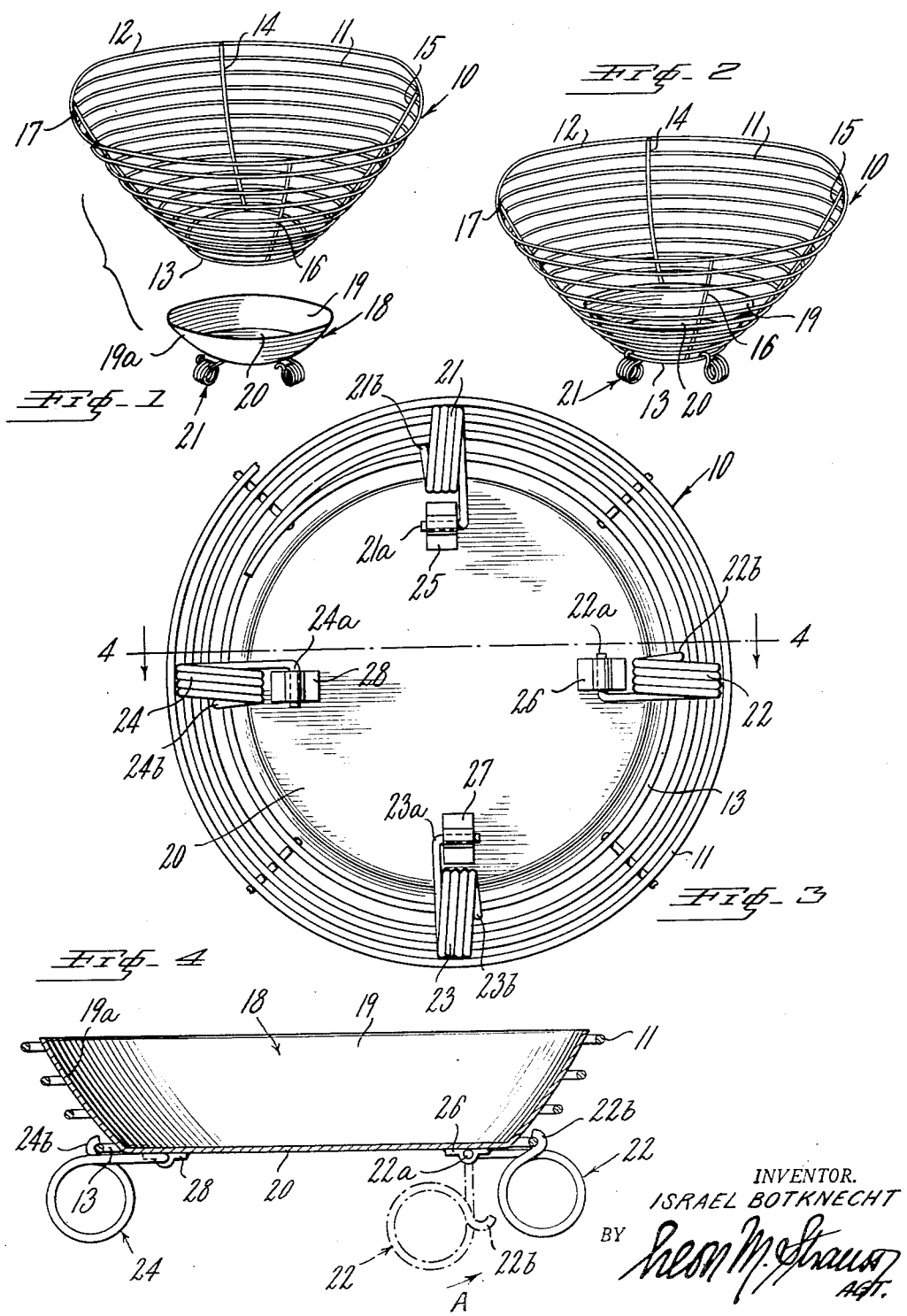

2,702,650

RECEPTACLE

Israel Botknecht, also known as Israel Botnik,
New York, N. Y.

Application June 5, 1952, Serial No. 291,824

3 Claims. (Cl. 220—19)

This invention relates generally to receptacles and more particularly to receptacles provided with open weave walls.

It is one of the objects of the invention to provide means affording the employment of the bottom of a receptacle with variously shaped receptacle bodies to thereby achieve interchangeability of the receptacle bodies with respect to a single bottom.

It is another object of the present invention to provide means facilitating the coupling of variously shaped receptacle bodies to a common bottom part.

It is still another object of the present invention to provide means ensuring the spacing of the bottom part from a support and rendering the possibility of interconnecting the bottom part with a predetermined shape of receptacle body in assembled position of the complete receptacle.

Yet a further object of the present invention resides in the provision of means for forming a receptacle body from a single wire wound in spiral or similar fashion so as to obtain a predetermined shape of receptacle body which surrounds the bottom part thereof with which it may be suitably connected in assembled condition of the complete receptacle.

A still further object of the present invention is to provide means conducive to a sturdy receptacle structure which may be used for various purposes such as fruit bowls, flower pots, bread dishes etc., which receptacle structure is firmly supported when placed on a suitable base.

The above and other objects and features will become apparent from the following detailed description, reference being had to the accompanying drawing in which:

Fig. 1 is an exploded view of the receptacle made in accordance with the invention and showing the receptacle body separated from the bottom and the support thereof, all illustrated in perspective.

Fig. 2 shows a perspective view of the receptacle in assembled condition.

Fig. 3 is an enlarged bottom plan view of the receptacle shown in Fig. 2.

Fig. 4 is a view in section, taken along lines 4—4 of Fig. 3.

Referring now more particularly to the drawing there is shown in Fig. 1 a wire receptacle body 10 manufactured from a preferably spirally wound element 11 having an enlarged upper diameter forming a rim 12 and a lower diameter forming the lower rim 13 of the receptacle body. The spirally wound receptacle body is reinforced by struts 14, 15, 16 and 17 to strengthen and stiffen the receptacle body 10. The bottom 18 of the receptacle is made from a drawn piece of sheet metal and has the hollow 19 and the bottom plate 20. At the under surface of the bottom plate 20 there are disposed supporting means 21, 22, 23 and 24 which principally consist each of a wire piece having several convolutions and terminating in respective ends 21a, 22a, 23a and 24a and further 21b, 22b, 23b and 24b. Ends 21a-24a extend in angular direction to the respective supporting means and form pivots therefor, which pivots are movably retained in lug bearings 25, 26, 27 and 28, whereby the supporting means 21-24 may be swung in a position similar to that shown in dot and dash lines in Fig. 4 with respect to the supporting foot 22. The lug bearings 25-28 inclusive are preferably welded or in any other way attached to the under surface of the bottom plate 20 as may be readily understood.

In order to assemble receptacle body 10 with bottom 18 the supporting means 21-24 are swung in a position as indicated in dotted lines in Fig. 4 and bottom 18 is inserted into the receptacle body 10 from above until the lower rim 13 engages the side wall 19a of the bottom piece forming the hollow 19 as seen in Fig. 4. It will be understood that by forming the receptacle body from a plurality of wire-wound convolutions arranged in progressively diminishing radius of curvatures toward the lower portion of the receptacle, and by simultaneously providing bottom element 18 with an oblique or upwardly divergent side wall 19a, accidental separation of said receptacle body and said bottom element is prevented in the assembled condition of the receptacle illustrated in Figs. 2 and 4.

Thus the lower convolutions of the spirally wound wire 11 surround the upwardly divergent side wall 19a and then extend therefrom inwardly as more clearly illustrated in Fig. 2. The supporting means 21-24 are then swung about the respective pivots 21a-24a in a direction of the arrow A whereby the ends 21b-24b overlappingly engage the lower rim forming wire 13 as clearly illustrated in Fig. 4. If desired, the ends 21b-24b may be provided with any suitable locking means to removably attach the receptacle body 10 to the bottom 18 or, if desired, the respective ends 21b-24b may be permanently attached to the wire rim 13 in any suitable manner. As it is well understood, the supporting means or feet 21-24 in this engagement position form a sturdy and firm support for the assembled receptacle.

It is well understood that the receptacle body 10 may assume any desired shape and configuration with respect to that part thereof, which extends beyond the bottom 18 which may then be used for variously shaped or sets of receptacle bodies to be used for flowers, flower pots, fruits and other food, such as bread. Thus the bottom 18 may be placed for sale with a set of receptacles of various shapes, which may be made either from wire of metal or of resinous plastics. The bottom 18 as well as the supporting means 21-24 may also be made from any suitable material such as metal, plastics or plastic compositions.

It can thus be seen that there has been provided in accordance with the invention a receptacle preferably with open weave walls made from wire, a bottom piece therefor, a plurality of supporting means attached to said bottom piece and connecting the latter to said receptacle body in one position thereof, whereby said supporting means engage a wire piece of the receptacle body, the remainder of said supporting means spacing said receptacle body and said bottom piece from a supporting base.

Although one specific embodiment of the invention has been described and shown in the drawing, it should be noted that the invention may be realized in modified form and adaptations of the arrangement herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. In a receptacle having a body portion and a bottom portion; said bottom portion being provided with a plurality of supporting means pivotally attached to the undersurface thereof, said body portion being connectable with said bottom portion through said supporting means and being formed of wire wound in convolutions arranged in progressively diminishing radius of curvature toward the lower portion of said body portion, said bottom portion being provided with an upwardly divergent side wall complementary in shape to said gradually diminishing convolutions of said lower portion of said body portion for preventing accidental separation of said body portion from said bottom portion when said bottom portion is inserted within said body portion in assembled position, each of said supporting means including a portion operatively engageable with a respective wire convolution for anchoring said bottom portion to said body portion, the remaining portion of each of said supporting means spacing said body portion when same is engaged with said bottom portion, from a supporting surface, said supporting means being each made from wire wound in a plurality of convolutions and terminating in an end for pivotal attachment to said underface and in said anchoring portion, respectively.

2. In a receptacle according to claim 1, including bearing means connected to the underface of said bottom element, said ends of said supporting means being journalled in said bearing means, respectively, to thereby permit swinging movement of said supporting means from inoperative position to operative locking position relative to said body portion when said bottom portion is assembled with the latter.

3. In a receptacle having a body portion and a bottom portion; said bottom portion being provided with a plurality of supporting means attached to the undersurface of said bottom portion, said body portion being connectable with said bottom portion through said supporting means and being formed of wire wound in convolutions arranged in progressively diminishing diameters toward the lower end of said body portion, said bottom portion being provided with an upwardly divergent side wall complementary in shape to respective convolutions of said lower end of said body portion for preventing accidental separation of said body portion from said bottom portion when said bottom portion is inserted within said body portion in assembled position of said receptacle, each of said supporting means being made of wire having convolutions terminating in opposite ends, one of said ends of each supporting means being shaped for engagement with a respective wire convolution of said body portion for anchoring said bottom portion to the latter, the other end of said supporting means forming parts of pivot means for said supporting means, said convolutions of said supporting means spacing said body portion from a supporting base, when said supporting means embrace said body portion exteriorly thereof and from below said bottom portion.

References Cited in the file of this patent

UNITED STATES PATENTS

| D. 138,327 | Smith et al. | July 18, 1944 |
| 85,523 | Gunther | Jan. 5, 1869 |
| 1,037,539 | Rodgers | Sept. 3, 1912 |
| 1,758,525 | Leon | May 13, 1930 |
| 2,539,024 | Leiby | Jan. 23, 1951 |

FOREIGN PATENTS

| 736,418 | France | Sept. 19, 1932 |